(12) United States Patent
Han et al.

(10) Patent No.: US 7,410,517 B2
(45) Date of Patent: Aug. 12, 2008

(54) DUST-SEPARATING APPARATUS FOR VACUUM CLEANER

(75) Inventors: Jung-Gyun Han, Busan (KR); Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 579 days.

(21) Appl. No.: 11/182,443

(22) Filed: Jul. 15, 2005

(65) Prior Publication Data

US 2006/0230718 A1    Oct. 19, 2006

Related U.S. Application Data

(60) Provisional application No. 60/666,302, filed on Mar. 29, 2005.

(30) Foreign Application Priority Data

May 9, 2005    (KR)    ............... 10-2005-0038289

(51) Int. Cl.
    *B01D 45/12*    (2006.01)
(52) U.S. Cl. .............. 55/337; 55/343; 55/457; 55/DIG. 3
(58) Field of Classification Search .......... 55/318, 55/337, 343, 348, 457, 486, DIG. 3
    See application file for complete search history.

(56) References Cited

U.S. PATENT DOCUMENTS 3,769,781 A * 11/1973 Klein et al. ............... 96/372

| | | | |
|---|---|---|---|
| 2002/0088079 A1 | 7/2002 | Oh | 15/352 |
| 2005/0028675 A1 | 2/2005 | Conrad et al. | 96/57 |
| 2005/0050863 A1 | 3/2005 | Oh | 55/345 |

FOREIGN PATENT DOCUMENTS

| | | |
|---|---|---|
| CN | 1593322 | 3/2005 |
| GB | 1319370 | 9/1971 |
| GB | 2406067 | 3/2005 |
| JP | 2002-326041 | 11/2002 |
| WO | WO0049932 | 8/2000 |
| WO | WO0074548 | 12/2000 |

OTHER PUBLICATIONS

Office Action dated Nov. 28, 2006 from the Russian Patent Office based on the Russian Patent Application No. 2005127983.

(Continued)

*Primary Examiner*—Robert A Hopkins
(74) *Attorney, Agent, or Firm*—Ohlandt, Greeley, Ruggiero & Perle, LLP

(57) ABSTRACT

A dust separating apparatus for a vacuum cleaner is provided. The dust separating apparatus comprises a first dust separating unit having a suction port, a guide member spirally, and a main filter to collect dust separated from drawn-in air, a second dust separating unit including a plurality of cyclones annularly arranged to centrifugally separate the dust from the air discharged from the first dust separating unit, and a cover unit to guide the air discharged from the first and the second dust separating units. The first dust separating unit separates the dust included in drawn-in air by rotating along the guide member and passing through the main filter the air drawn in through the suction port. The second dust separating unit rotates the air discharged from the first dust separating unit, thereby further filtering the air.

14 Claims, 2 Drawing Sheets

OTHER PUBLICATIONS

Figure 1:
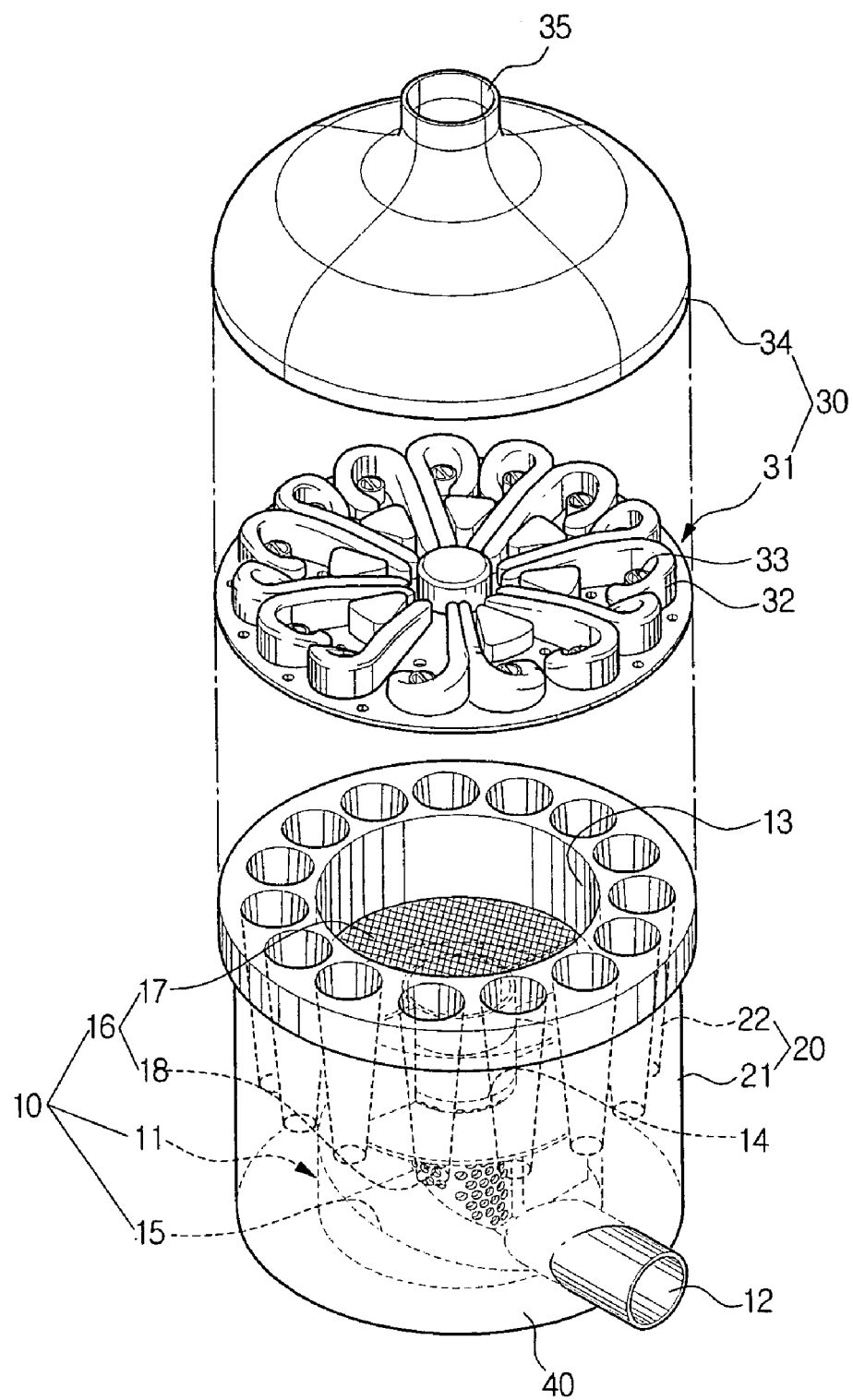

Official Action dated May 18, 2007 from corresponding Chinese Patent Application No. 200510098685.9.

Extended European Search Report daed Sep. 15, 2006 issued from the European Patent Office with respect to European Patent Application No. 05291770.5 filed on Aug. 23, 2005.

* cited by examiner

DUST-SEPARATING APPARATUS FOR VACUUM CLEANER

CROSS-REFERENCE TO RELATED APPLICATIONS

This application claims benefit under 35 U.S.C. § 119(e) of U.S. Provisional Application No. 60/666,302 filed on Mar. 29, 2005 in the United States Patent and Trademark Office, and benefit under 35 U.S.C. § 119(a) of Korean Patent Application No. 2005-38289 filed on May 9, 2005 in the Korean Intellectual Property Office, the entire disclosures of which are incorporated herein by reference.

BACKGROUND OF THE INVENTION

1. Field of the Invention

The present invention relates to a vacuum cleaner. More particularly, the present invention relates to a dust separating apparatus mounted in a vacuum cleaner body to separate and collect dust included in drawn-in air.

2. Description of the Related Art

General vacuum cleaners comprise a dust separating apparatus which draws in dust-laden air using a suction force generated by a suction motor mounted in a cleaner body and separates dust from the drawn-in air.

Generally, after centrifugally separating the dust from the drawn-in air, the dust separating apparatus discharges clean air to the outside and collects the separated dust in a dedicated dust collecting chamber.

The dust separating apparatus comprises a cyclone body for centrifugally separating the dust, a suction path formed along a circumference of the cyclone body, and a discharge path formed on an upper portion of the cyclone body.

According to the above configuration, the dust-laden air drawn in through the suction path from a surface being cleaned is separated into clean air and dust in the cyclone body by a centrifugal force. Here, the cleaned air is discharged out through the discharge path while the dust is collected in the cyclone body.

In order to enhance dust separating efficiency, a multi-cyclone dust separating apparatus comprising a plurality of cyclones has recently been developed. For example, as disclosed in Korean Patent Application No. 10-2003-0062520, which is the prior application of the present application, a dust separating apparatus comprises a first cyclone for separating relatively rough dust and a plurality of second cyclones formed along an outer circumference of the first cyclone to separate relatively fine dust.

The multi-cyclone dust separating apparatus can improve the dust separating efficiency by sequentially arranging a plurality of cyclones. However, in the multi-cyclone dust separating apparatus, an air path is formed long and a course of airflow becomes complex, thereby deteriorating an initial suction force and increasing loss of pressure. Accordingly, researches for overcoming such problems have been being activated.

SUMMARY OF THE INVENTION

An aspect of the present invention is to solve at least the above problems and/or disadvantages and to provide at least the advantages described below. Accordingly, an aspect of the present invention is to provide a dust separating apparatus capable of improving dust separating efficiency by separating dust drawn in from a surface being cleaned through multi-step processes, and decreasing loss of pressure.

Another aspect of the present invention is to provide a dust separating apparatus capable of improving an initial suction force thereof.

In order to achieve the above-described aspects of the present invention, there is provided a dust separating apparatus for a vacuum cleaner, comprising a first dust separating unit including a fist dust separating unit body having a suction port, a guide member spirally formed within the first dust separating unit body, and at least one main filter to collect dust separated from drawn-in air, a second dust separating unit including a plurality of cyclones annularly arranged along a brim of the first dust separating unit so as to centrifugally separate the dust from the air discharged from the first dust separating unit, and a cover unit connected above the first and the second dust separating units to guide the air discharged from the first and the second dust separating units. The first dust separating unit separates the dust included in drawn-in air by rotating along the guide member and passing through the main filter the air drawn in through the suction port, the second dust separating unit rotates the air discharged from the first dust separating unit, thereby further centrifuging the air, and the cover unit moves the air discharged from the first dust separating unit to the second dust separating unit and discharges to the outside the air discharged from the second dust separating unit.

The suction port of the first dust separating unit penetrates a lower portion of the first dust separating unit body, so that the air drawn in through the suction port is rotated from a lower portion to an upper portion of the first dust separating unit body.

The first dust separating unit further comprises a sub discharge duct mounted in the center of the first dust separating unit body. The dust separating apparatus further comprises a sub filter mounted below the sub discharge duct.

According to an embodiment of the present invention, the second dust separating unit collects the dust separated by the plurality of cyclones and further comprises a second dust separating unit body enclosing the plurality of cyclones. In the first dust separating unit body, the air is discharged through the main discharge port formed by opening the upper portion of the first dust separating unit body and the sub discharge duct formed in the center of the first dust separating unit body in fluid communication with the main discharge port.

The main filter faces the main discharge port and the sub filter is formed near the suction port through which external air is drawn in.

The cover unit comprises a first cover guiding the air discharged from the first dust separating unit to the second dust separating unit; and a second cover formed on an upper portion of the first cover to discharge to the outside the air discharged from the second dust separating unit.

According to another embodiment of the present invention, a dust separating apparatus is provided that includes a first dust separating unit that separates dust via whirling and at least one filtering step and a second dust separating unit that separates dust via centrifugation.

BRIEF DESCRIPTION OF THE DRAWING FIGURES

Figure 2:
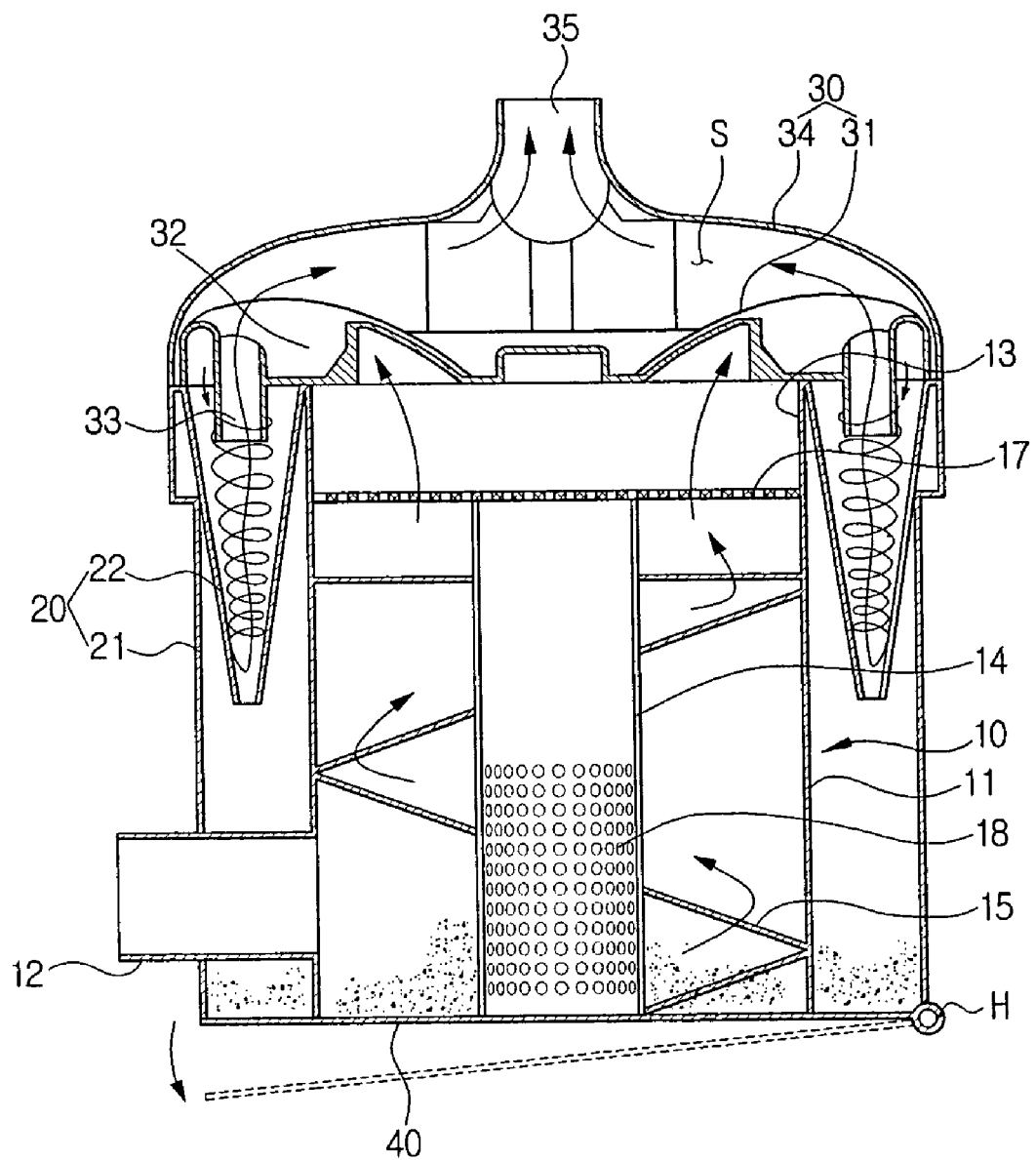

The above aspect and other features of the present invention will become more apparent by describing in detail exemplary embodiments thereof with reference to the attached drawing figures, wherein:

FIG. 1 is an exploded, perspective view of a dust separating apparatus for a vacuum cleaner, according to an embodiment of the present invention; and FIG. 2 is a sectional view schematically showing the dust separating apparatus for a vacuum cleaner, shown in FIG. 1.

DETAILED DESCRIPTION OF THE
EXEMPLARY EMBODIMENTS

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

As shown in FIGS. 1 and 2, a dust separating apparatus for a vacuum cleaner, according to an embodiment of the present invention is shown. The dust separating apparatus comprises first and second dust separating units 10 and 20, and a cover unit 30.

The first dust separating unit 10 separates relatively rough or large dust from drawn-in external air by inertia and filtering. To this end, the first dust separating unit 10 comprises a first dust separating unit body 11, a guide member 15, and a filter member 16.

The first dust separating unit body 11 includes a suction port 12 through which the external air is drawn in, a main discharge port 13, and a sub discharge duct 14 through which the drawn-in air is discharged.

The suction port 12 is a path for dust-laden air, drawn in from a surface being cleaned by a suction force generated in a cleaner body, to flow into the first dust separating unit body 11. The suction port 12 penetrates a lower portion of the first dust separating unit body 11.

After the relatively rough dust is separated from the air which is drawn in through the suction port 12, the air is discharged from the first dust separating unit body 11, passing through the main discharge port 13 and/or the sub discharge duct 14.

The main discharge port 13 is formed by opening an upper portion of the first dust separating unit body 11. The sub discharge duct 14 is disposed in the center of the first dust separating unit body 11 and fluidly communicated with the main discharge port 13. Air discharged through the sub discharge duct 14 is converged with air discharged through the main discharge port 13 and flows into the second dust separating unit 20.

The guide member 15 is spirally formed within the first dust separating unit body 11 to guide the air drawn in through the suction port 12 to the main discharge port 13 in a whirling manner. Consequently, inertia is generated from the whirling air current formed by the guide member 15, thereby enabling separation of the dust in the dust-laden air.

The filter unit 16 filters the dust from the dust-laden air drawn in through the suction port 12. For this, the filter unit 16 comprises a main filter 17 and a sub filter 18. The main and sub filters 17, 18 filter the air before the second dust separating unit 20.

The main filter 17 separates dust from the air being whirling by the guide member 15 and guided to the main discharge port 13. For this, the main filter 17 is mounted to face the main discharge port 13. In other words, the main filter 17 is mounted on the open upper portion of the first dust separating unit body 11.

The sub filter 18 is disposed below the sub discharge duct 14, more preferably near the suction port 12. Therefore, the sub filter 18 separates a part of the dust-laden air drawn in through the suction port 12, thereby increasing an initial suction force of the dust separating apparatus. The dust-laden air partially filtered by the sub filter 18 is discharged from the first dust separating unit body 11 through the sub discharge duct 14.

The main filter 17 and the sub filter 18 have different mesh density from each other. Preferably, the sub filter 18 has more dense mesh than the main filter 17, so as to maintain the suction efficiency with the main filter 17 although the sub filter 18 is clogged by the separated dust.

Here, the relatively rough dust separated from the drawn-in air by the guide member 15 and the filter unit 16 is collected in the first dust separating unit body 11.

The second dust separating unit 20 centrifugally separates the relatively fine dust from the air discharged from the first dust separating unit 10. For this, the second dust separating unit 20 includes a second dust separating unit body 21 and a plurality of cyclones 22.

The air discharged from the first dust separating apparatus unit 10 passes through the second dust separating unit body 21 and during this, the separated dust is collected in the second dust separating unit body 21. The second dust separating unit body 21 is formed to enclose an outer circumference of the first dust separating unit body 11 and the plurality of cyclones 22.

The plurality of cyclones 22 are annularly arranged along the second dust separating unit body 21 to separate relatively fine dust which has not yet been filtered by the first dust separating unit 10, using a centrifugal force. The cyclones 22 respectively have a truncated conical shape of which upper and lower portions are open.

More specifically, the cyclones 22 have therein a cyclone path, respectively. While the air drawn in from the upper portion of the cyclones 22 descends along the cyclone path and ascends back, the relatively fine dust is separated from the air. The separated dust is collected within the second dust separating unit body 21 through the open lower portion of the cyclones 22.

As shown in FIG. 2, the dust respectively collected in the first and the second dust separating unit bodies 11 and 21 are discharged to the outside by selectively opening a common bottom 40 of the first and the second dust separating unit bodies 11 and 21 using a hinge H. Here, the bottom 40 of the first and the second dust separating unit bodies 11 and 21 is preferably formed as one body so as to be opened altogether by the hinge H.

The cover unit 30 is mounted above the first and the second dust separating units 10 and 20. The cover unit 30 comprises first and second covers 31 and 34 to guide the air discharged from the first and the second dust separating units 10 and 20, respectively.

The first cover 31 guides the air discharged from the first dust separating unit 10 into the second dust separating unit 20. Therefore, the first cover 31 comprises influent paths 32 and discharge paths 33.

The influent paths 32 extend radially from the center of the first cover 31 toward the second dust separating unit 20. Also, being fluidly communicated with the open upper portion of the plurality of cyclones 22 of the second dust separating unit

20, the influent paths 32 guide the air discharged from the first dust separating unit 10 into the plurality of cyclones 22, causing the centrifugal force.

The discharge paths 33 are passages through which the air centrifuged and ascending back is discharged. For favorable discharge of the air, the discharge paths 33 are inserted into the plurality of cyclones 22 by a predetermined depth.

The second cover 34 is disposed above the first cover 31. The air discharged from the second dust separating unit 20 is discharged through the second cover 34. In the center of the second cover 34, an outlet 35 is formed to discharge the air to the outside.

The second cover 34 discharges altogether the air being discharged through the discharge path 33 of the first cover 31. To this end, a space 0 is reserved between the first and the second covers 31 and 34 for convergence of the air discharged from the plurality of cyclones 22.

Hereinbelow, the operation of the above-structured dust separating apparatus of a vacuum cleaner, according to an embodiment of the present invention, will be described with reference to FIG. 2.

Referring to FIG. 2, air is drawn in from the surface being cleaned to the first dust separating unit 10 through the suction port 12. A part of the drawn-in air is filtered by the sub filter 18 by the suction force and discharged through the sub discharge duct 14, and the rest of the drawn-in air is rotated along the guide member 15 in a whirling manner. A part of the air rotating and ascending along the guide member 15 may be filtered through the sub filter 18 formed along the guide member 15 by a predetermined length.

The relatively rough dust is separated from the drawn-in air rotating along the guide member 15 by inertia of the rotating air. The dust, which has not yet been separated, is filtered by the main filter 17.

Since the sub filter 18 has more dense mesh than the main filter 17, the sub filter 18 may be clogged by the rough dust. In this case, the main filter 17 is in charge of the filtering operation.

Thus, the relatively rough dust is separated through multi-step processes by the guide member 15 and the filter unit 16 of the first dust separating unit 10 and collected in the dust separating unit body 11.

The air passed through the main and the sub filters 17 and 18 is discharged to the outside of the first dust separating unit 10 through the main discharge port 13 and the sub discharge duct 14. The discharged air is guided by the first cover 31 into the second dust separating unit 20.

The air discharged from the first dust separating unit 10 is distributed into the respective cyclones 22 through the influent path 32 of the first cover 31. From the air flowing into the plurality of cyclones 22, relatively fine dust, which has not yet been filtered in the first dust separating unit 10, is separated centrifugally.

Then, the dust-separated air ascends back to be discharged from the second dust separating unit 20 through the discharge path 33. The relatively fine dust centrifugally separated by the plurality of cyclones 22 is collected into the second dust separating unit 20, passing through the open lower portion of the second cyclones 22.

The air discharged from the second dust separating unit 20 is converged in the space S between the first and the second covers 31 and 34 and then discharged to the outside of the dust separating apparatus through the outlet 35.

The dust collected in the first and the second dust separating unit bodies 11 and 21 is discharged to the outside by opening the common bottom 40 of the first and the second dust separating unit bodies 11 and 21 using the hinge H. The bottom 40 can be opened when the suction force within the first and the second dust separating unit bodies 11 and 21 is removed. With the suction force removed, the dust separated from the drawn-in air by the guide member of the first dust separating unit body 11 is collected on the bottom 40 within the first dust separating unit body 11.

As described above, since the dust is separated by multi-step processes, that is, by inertia, filtering and centrifugation, the dust separating efficiency can be improved.

Also, the above-described dust separating apparatus according to an embodiment of the present invention is able to decrease loss of pressure.

In addition, by providing the main and the sub filters 17 and 18 to the first dust separating unit 10, relatively rough dust is prevented from entering the second dust separating unit, thereby enhancing an initial suction force.

While the invention has been shown and described with reference to certain embodiments thereof, it will be understood by those skilled in the art that various changes in form and details may be made therein without departing from the spirit and scope of the invention as defined by the appended claims.

What is claimed is:

1. A dust separating apparatus for a vacuum cleaner, comprising:
    a first dust separating unit including a first dust separating unit body having a suction port, a guide member spirally formed within the first dust separating unit body, and at least one main filter to collect dust separated from drawn-in air;
    a second dust separating unit including a plurality of cyclones annularly arranged along a brim of the first dust separating unit so as to centrifugally separate the dust from the air discharged from the first dust separating unit; and
    a cover unit connected above the first and the second dust separating units to guide the air discharged from the first and the second dust separating units,
    wherein the first dust separating unit separates the dust included in drawn-in air by rotating along the guide member and passing through the main filter the air drawn in through the suction port, the second dust separating unit rotates the air discharged from the first dust separating unit, thereby further centrifuging the air, and the cover unit moves the air discharged from the first dust separating unit to the second dust separating unit and discharges to the outside the air discharged from the second dust separating unit.

2. The dust separating apparatus of claim 1, wherein the suction port of the first dust separating unit penetrates a lower portion of the first dust separating unit body, so that the air drawn in through the suction port is rotated from a lower portion to an upper portion of the first dust separating unit body.

3. The dust separating apparatus of claim 2, wherein the first dust separating unit further comprises a sub discharge duct mounted in the center of the first dust separating unit body.

4. The dust separating apparatus of claim 3, further comprising a sub filter mounted below the sub discharge duct.

5. The dust separating apparatus of claim 4, wherein the second dust separating unit collects the dust separated by the plurality of cyclones and further comprises a second dust separating unit body enclosing the plurality of cyclones.

6. The dust separating apparatus of claim 5, wherein, in the first dust separating unit body, the air is discharged through the main discharge port formed by opening the upper portion of the first dust separating unit body and the sub discharge duct formed in the center of the first dust separating unit body in fluid communication with the main discharge port.

7. The dust separating apparatus of claim 6, wherein the main filter faces the main discharge port and the sub filter is formed near the suction port through which external air is drawn in.

8. The dust separating apparatus of claim 1, wherein the cover unit comprises:
   a first cover guiding the air discharged from the first dust separating unit to the second dust separating unit; and
   a second cover formed on an upper portion of the first cover to discharge to the outside the air discharged from the second dust separating unit.

9. A dust separating apparatus for a vacuum cleaner, comprising:
   a first dust separating unit separating dust from drawn-in air, said first dust separating unit having a main filter, a sub filter, and a spiral guide member, said spiral guide member whirling a first part of said drawn-in air to separate said dust, said main filter filtering dust from said first part of said drawn-in air, and said sub filter filtering said dust from a second part of said drawn-in air;
   a second dust separating unit enclosing an outer circumference of said first dust separating unit, said second dust separating unit having a plurality of cyclones; and
   a first cover converging said first and second parts of said drawn-in air into converged air and discharging said converged air into said plurality of cyclones so that said plurality of cyclones centrifugally separating said dust from said converged air.

10. The dust separating apparatus of claim 9, wherein said first dust separating unit comprises a suction port that penetrates a lower portion of said first dust separating unit so that said drawn-in air is whiled by said guide member from a lower portion to an upper portion of said first dust separating unit.

11. The dust separating apparatus of claim 9, wherein said first cover comprises a plurality of discharge paths that discharge clean air from said plurality of cyclones.

12. The dust separating apparatus of claim 11, wherein said plurality of discharge paths extend into said plurality of cyclones by a predetermined depth.

13. The dust separating apparatus of claim 9, wherein said first and second dust separating units comprise a common bottom so that said dust separated by said first and second dust separating units can be discharged by selectively opening said common bottom.

14. The dust separating apparatus of claim 9, further comprising a second cover formed on an upper portion of said first cover, said second cover discharging clean air from said plurality of cyclones to an outside of the dust separating apparatus.

* * * * *